United States Patent [19]
Dethlefsen

[11] 4,176,385
[45] Nov. 27, 1979

[54] EXPLOSIVELY ACTIVATED FAULT CURRENT LIMITER

[75] Inventor: Rolf Dethlefsen, Greensburg, Pa.

[73] Assignee: Electric Power Research Institute, Inc., Palo Alto, Calif.

[21] Appl. No.: 899,539

[22] Filed: Apr. 24, 1978

[51] Int. Cl.² .......... H02H 7/22
[52] U.S. Cl. .......... 361/58; 361/115; 200/144 AP; 200/150 R; 337/401
[58] Field of Search .......... 361/58, 57, 54, 55, 361/115, 56; 200/144 AP, 145, 150 R, 150 M, 150 D, 150 G, 61.08; 337/401; 102/263

[56] References Cited

U.S. PATENT DOCUMENTS

| | | | |
|---|---|---|---|
| 2,931,874 | 4/1960 | Leaman | 102/263 |
| 3,932,717 | 1/1976 | Dike et al. | 200/61.08 |
| 3,962,605 | 6/1976 | Thaler | 200/61.08 X |

OTHER PUBLICATIONS

"Two Stage Opening Switch Technique for Generation of High Inductive Voltages", by Conte et al., Naval Research Laboratory, Oct. 25–28, 1977.

"Explosively Actuated 100kA Opening Switch for High Voltage Application", by Nord et al., Plasma Physics Division of Naval Research Lab., May 25–27, 1977.

"Two-Stage Electroexplosive Circuit Breaker", by Zeltoz et al., Institute of Scientific Research . . . , U.S.S.R., 1976.

"Explosive Switch for Interrupting Inductive Circuits", by Young et al., Naval Research Laboratory, Sep. 1976.

*Primary Examiner*—Patrick R. Salce
*Attorney, Agent, or Firm*—Flehr, Hohbach, Test

[57] ABSTRACT

An explosively activated current interrupter is provided for use in a fault current limiting system employing a plurality of such interrupters. Each interrupter includes an automatic switching system for sequentially installing each of a plurality of the interrupters on a power line. A conductive member in the interrupter housing conducts current carried by the power line. An explosive charge in the housing breaks the conductive member into a plurality of separated portions upon detonation, thereby interrupting the power line current. A switch opened and closed by means of explosive gas pressure alternately installs and removes the interrupter from the power line. Each interrupter is connected by a gas conduit to the next sequential interrupter to be detonated. Upon detonation of one interrupter, a portion of the explosion gases are transferred by the conduit to the next interrupter, operating the switch to install the next interrupter on the power line after an appropriate delay.

23 Claims, 4 Drawing Figures

EXPLOSIVELY ACTIVATED FAULT CURRENT LIMITER

BACKGROUND OF THE INVENTION

This invention relates to current interrupters of the type used in controlling fault currents associated with transmission lines in power distribution systems. More particularly, the invention relates to such interrupters which are explosively activated.

Fast-acting current interrupters are used on power distribution and transmission lines in current limiting circuits. Fault currents on high voltage lines, due to ground shorts, for example, can rapidly become enormous and cause serious equipment damage. As transmission voltages rise, there is a continuing need in the electric power industry for improved current interrupting devices for use in rapidly controlling fault currents.

Current limiting circuits employ current interrupters which open to divert current through an associated current-supressive impedance. The impedance limits the fault current to a safe level. Preferably, the circuit is reestablished as rapidly as possible after the source of the fault is eliminated. In cases of short-lived fault sources such as lightning bolts, the opening and closing of the current interrupter is preferably handled automatically. Upon opening, the interrupter should produce a large voltage drop sufficient to divert the fault current through the associated protective impedance.

One type of explosive interrupter produces a large number of series breaks in the current path through multiple fracturing of a conductive member. Such as interrupter is described in an experimental report entitled *Explosive Switch for Interrupting Inductive Circuits,* By M. P. Young et al, published by the Naval Research Laboratory and presented at the Pulse Power Systems Workshop, September 1976. Because such explosive interrupters are one-shot devices, it is desireable to provide a system for sequentially installing and removing such interrupters from a current limiting circuit.

OBJECTS AND SUMMARY OF THE INVENTION

It is an object of the present invention to provide an explosively activated current interrupter which uses the principle of explosive actuation to attain a fast and reliable fault current limiter system.

Another object of the invention is to provide an interrupter which, upon completion of a fault current diversion, automatically installs another interrupter on the power line.

Accordingly, an explosively activated current interrupter is provided for use in a system employing a plurality of the interrupters activated in a predetermined sequence of interrupters to control a succession of power line faults. The interrupter includes a housing and a conductive member in the housing for conducting current carried by the power line. Switch means is provided in the housing for interconnecting the conductive member with the power line. The switch means assumes either a closed position in which the switch electrically connects the conductive member with the power line, or an open position where the conductive member is electrically disconnected from the power line. Insertion means are also provided for closing the switch a predetermined time after the insertion means is actuated. Explosive means in the housing serve to break the conductive member into a plurality of separated portions upon detonation to interrupt the power line current. The explosive means also opens the switch means. Finally, means are provided responsive to the detonation of the explosive means for actuating the insertion means in the next interrupter of the predetermined sequence of interrupters.

DESCRIPTION OF THE PREFERRED EMBODIMENT

Figure 1:
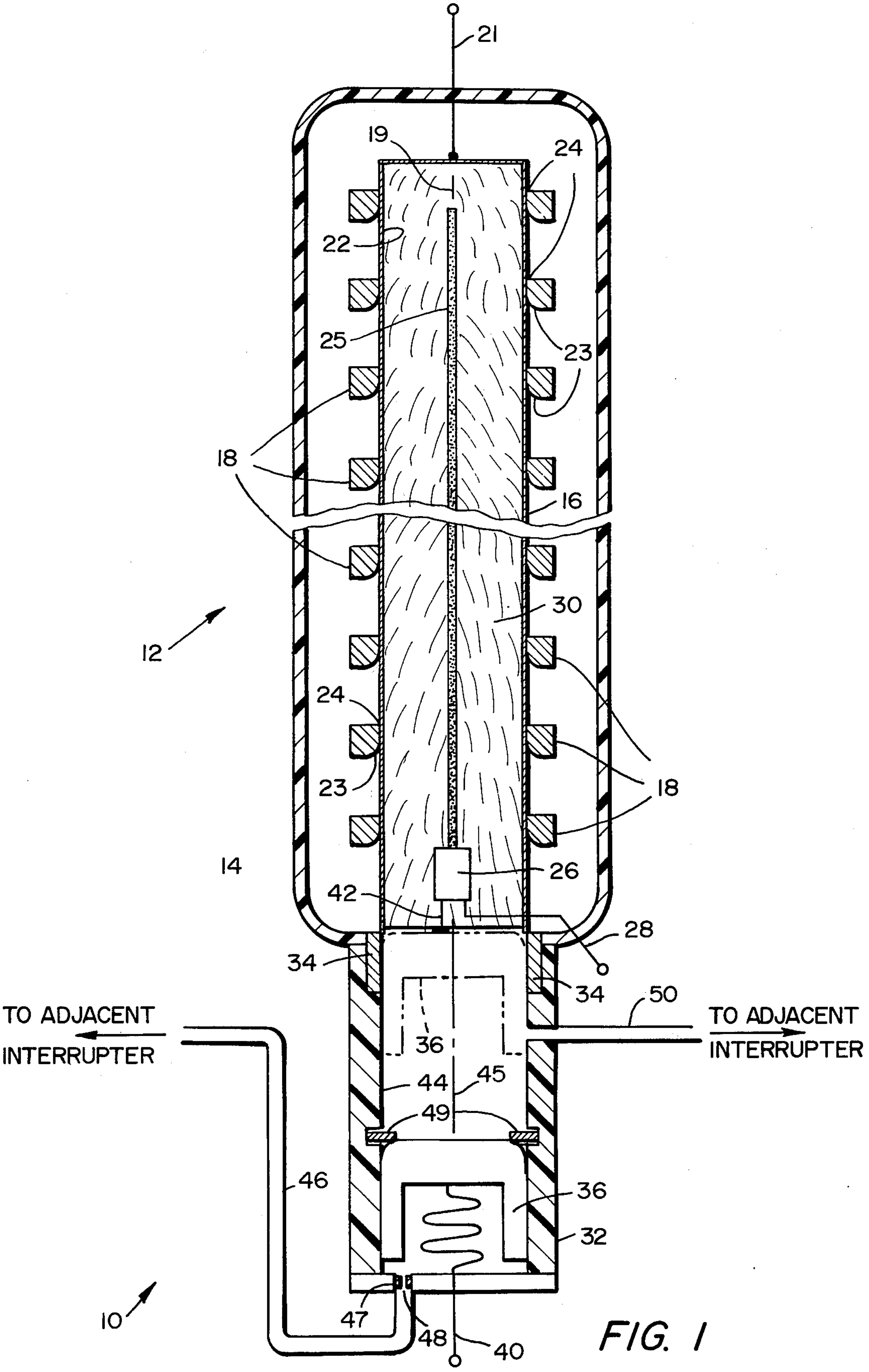
FIG. 1 is a cross-sectional view of a current interrupter according to the invention.
Figure 2:
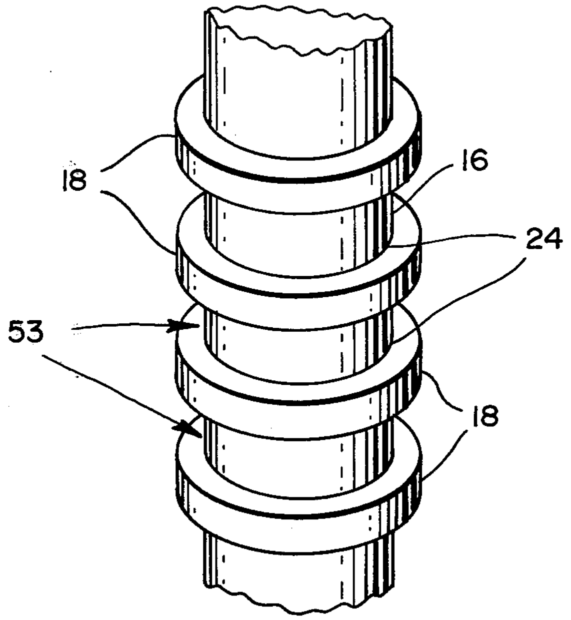
FIG. 2 is a partial perspective view of the conductive member and encircling rings of the interrupter shown in FIG. 1.

Referring to FIG. 1, an interrupter 10, according to the invention, is shown with an external housing 12 formed of an insulating material such as strong fiberglass. The upper portion 14 of the housing encloses a conductive member 16 used for conducting current carried by a power line. Member 16 is a cylindrical tube formed of a conductive metal such as aluminum, copper, or a suitable alloy. The cylindrical wall portions of conductive tube 16 are surrounded by a plurality of high-strength metal ring-shaped members 18. Rings 18, preferably formed of a magnetic steel, are substantially coaxial with axis 19 of tube 16, and are spaced apart along the length of tube 16 at regular intervals. The configuration of rings 18 and tube 16 is best shown in FIG. 2. The rings have inner surfaces with one corner 23 rounded and the other corner 24 square, to serve as a cutting edge. Rings 18 are supported in position by tube 16 prior to detonation of the interruptor. The upper end of tube 16 is connected to terminal 21 which extends through housing 12 for connection to a power line. Explosive means are provided in housing 12 inside interior cavity 22 within tube 16. The explosive means include detonation cord 25 disposed substantially coaxially with tube axis 19, and detonator cap 26. Cord 25 can be any suitable explosive cord such as a 50 grain PETN (pentaerythritol tetranitrate) detonating cord, and cap 26 is preferably an electrically fired bridge wire detonator such as a Reynolds RP-80. Cap 26 fires cord 25 on recept of a signal over detonating wire 28. Cord 25 is molded in place by a dielectric substance such as paraffin 30 which fills tube 16. Alternatively, another suitable dielectric could be used, preferably a solid which can flow under the action of the explosive.

Lower portion 32 of housing 12 encloses switch means for interconnecting conductive tube 16 with an external power line. The switch means comprises fixed contact 34 electrically interconnected with tube 16, and a weighted contact 36 supported for substantially vertical movement. A braided flexible wire 38 connects movable contact 36 with an external connecting terminal 40 for connection to a power line. The switch is shown (with solid lines) in FIG. 1 in the open position in which tube 16 is electrically disconnected from the power line. The switch also assumes a closed position, shown in phantom in FIG. 1, in which contact 36 electrically connects tube 16 with the power line. In the closed position, contact 36 also completes a path to detonator cap 26 by way of contact 42, arming the detonator for firing by a signal on line 28.

Contact 36 is supported for movement in a cylindrical chamber 44. The contact is movable between an open position shown with solid lines and a closed position, shown in phantom in FIG. 1. Chamber 44 is formed within the walls 32 of the lower portion of the housing. Walls 32 are formed of fiberglass or another suitable high strength dielectric material. Cylindrical chamber 44 is part of a pneumatic means for closing the contact switch. Gas conduit 46 provides a path for released gases from another interrupter to enter chamber 44 via opening 47. The conduit includes an aperture member in opening 47 having a control aperture 48 which restricts the flow of gas supplied to chamber 44. An additional gas conduit 50 connects to still another adjacent interrupter, permitting release of gases from chamber 44 via opening 52. Shear pins 49 provide means in chamber 44 for latching contact 36 in the open position using frangible members which break away to release the piston. As described more fully below, contact 36, aperture 48, and pins 49 form part of the insertion means for closing the switch and installing the interrupter on a power line a predetermined time after actuation thereof.

Figure 3:
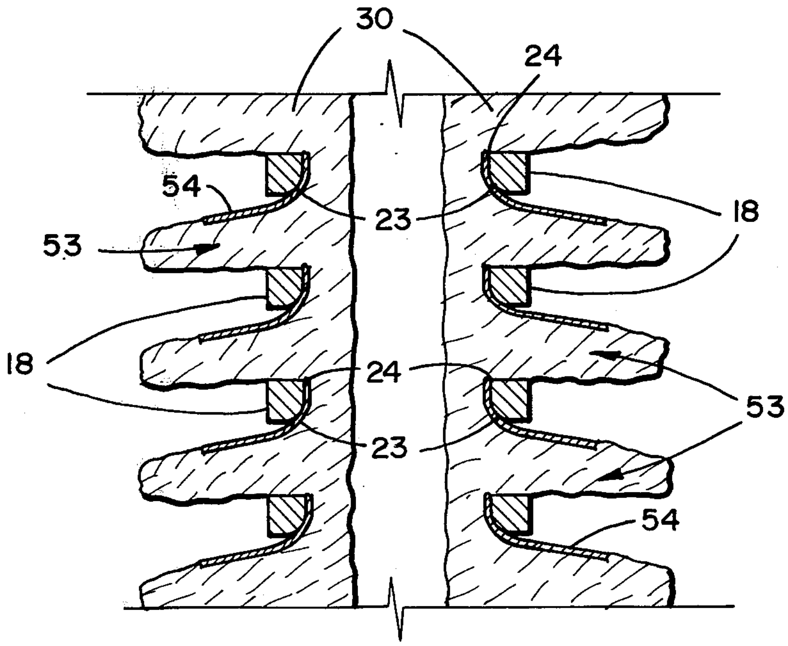
FIG. 3 is a partial cross-sectional view of the interrupter of FIG. 1 following detonation of the explosive.

The effect produced in interrupter 10 upon detonation of explosive cord 24 is shown in FIG. 3. Detonation of cord 24 produces an enormous increase in pressure within tube 16. The pressure forces those portions of the tube in the regions 53 between rings 18 outwardly. The tube generally breaks adjacent square edge 24 of rings 18, with the fragments 54 wrapping around the curved corners 23. A series of annular gaps 53 are thereby created in which arcing occurs under high current and pressure conditions. The paraffin 30 in tube 16 flows outwardly under the heat and force of the explosion, coating the tube fragments 54 with paraffin and also filling gaps 53. The paraffin serves to hold the rings 18 and tube fragments 54 in place following detonation.

Immediately following the explosion, arcing occurs in the gaps 53. The paraffin serves as a solid dielectric which increases the voltage drop of the arcs. Paraffin provides a good insulating medium for producing high arc voltages because paraffin releases hydrogen during arcing. It is known that an arc burning in high pressure hydrogen creates a relatively high arc voltage. Such an effect is experienced with arcs burning under oil. Because the conductive tube breaks into many short segments, a plurality of series arcs develop. Numerous short arcs in series further increase the voltage drop of the interruption.

Figure 4:
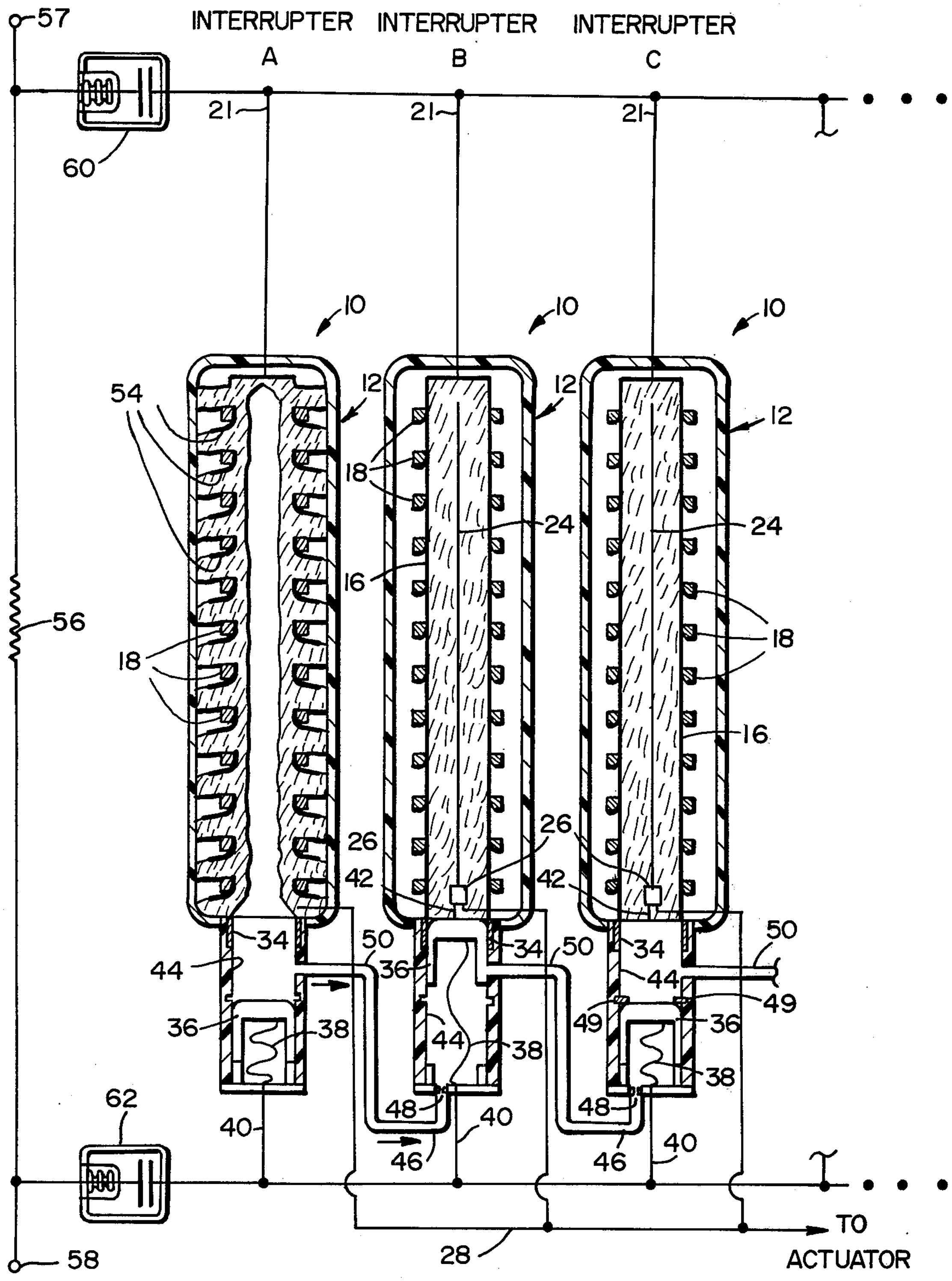
FIG. 4 is a partial circuit diagram showing the external connections for a plurality of the interrupters shown in FIG. 1.

Use of the interrupter of this invention in a system for controlling a succession of power line faults is illustrated in FIG. 4. A plurality of interrupters 10 are installed in parallel with a suitable current-supressive impedance which is on line in a power distribution system. Element 56 represents the current-supressive impedance. The power line is connected between points 57 and 58. Interrupters A, B, and C are illustrative of a plurality of interrupters installed in a magazine of perhaps twenty, in parallel with impedance 56. Gas conduits 46 and 50 are interconnected between adjacent interrupters. Detonation wires 28 are all connected to a suitable actuating means (not shown) for detonating the explosive and thus firing the interrupters. A pair of fast-acting vacuum-type current interrupters 60 and 62 can be placed in series between impedance 56 and the interrupters in order to aid dielectric recovery if needed. The vacuum interrupters are preferably of the type having mechanically separated electrodes which can be opened and reclosed on signal. At the time of installation, one interrupter, for example Interrupter A, is installed on-line by closing switch contact 36, to provide a current path around impedance 56. During normal current levels, the interrupter which is on-line will carry the line current between points 57 and 58. In the on-line interrupter, which is Interrupter B in FIG. 4, current passes through connecting terminal 21, conductive contact tube 16, switch contact 34 and 36, and wires 38 and 40. Vacuum interrupters 60 and 62 remain closed during normal current levels. A line-monitoring actuating means (not shown), to which detonation wires 28 and the vacuum interrupters are connected, continuously monitors the current on the power line. When a rapid rise in current level indicates a line fault, the actuating means sends a signal over line 28 to the on-line interrupter activating the interrupter by detonating the explosive. Only the interrupter with contact 36 in the position shown in Interrupter B will respond to the detonation signal because only in that interrupter will detonator contact 42 be closed. Upon detonation, the explosive in the on-line interrupter explodes to produce a series of breaks in conductive tube 16, as shown in FIG. 3. Arcing occurs in the intervening gaps 53 between tube fragments 54 and such arcs will carry substantially the full fault current until a sufficient voltage drop is developed to divert the current through impedance 56. The dielectric paraffin pushed into gaps 53 aids in extinguishing the arc. The paraffin also helps prevent arc reignition even under large recovery voltages. Vacuum interrupters 60 and 62 are also opened by the previously-mentioned actuating means when the fault is detected. Because such vacuum interrupters open more slowly than explosive interrupters 10, the vacuum interrupters serve principally to help prevent arc reignition. As noted above, use of such vacuum interrupters is optional. If rings 18 are made of a magnetic steel which is magnetically saturated at high currents, an additional inductance will be introduced in the interrupter circuit which will slow the rate of fall of current toward zero. Such inductance will also aid dielectric recovery.

FIG. 4 shows the relative modes of Interrupters A, B, and C at a time following the firing of Interrupter A and prior to the firing of Interrupter B. The gas conduit interconnections shown in FIG. 4 produce a predetermined firing sequence which controls a succession of power line faults. For example, following the firing Interrupter A, the increased gas pressure in chamber 44 produced by the explosion drives movable switch contact 36 to the bottom of the cylinder, opening the switch. The gas pressure in chamber 44 also actuates the insertion means in the next interrupter of the sequence, Interrupter B. Gas is transferred from Interrupter A to Interrupter B via gas conduit 46/50. The conduit provides means responsive to the detonation of the explosive in Interrupter A for closing the contact switch in Interrupter B. The increased gas pressure supplied to the lower portion in cylinder 44 raises the gas pressure in the lower part of the chamber. When the pressure reaches a predetermined level, the latch provided by shear pins 49 is released, permitting the contact in Interrupter B to rapidly move upwardly, closing the switch. Pins 49 are conventional frangible members which break under a predetermined shear stress. Use of such shear pins, or a suitable alternative, prevents contact creep and slow closing of the insertion switch which might cause incomplete closure. The closing of contact 36 arms detonator 26. Interrupter B is now installed on-line and will resume carrying the line current whenever vacuum interrupters 60 and 62 are closed by the previously-mentioned actuating means.

Interrupter C remains off-line and ready to assume the current-carrying function following the firing of Interrupter B. Additional interrupters are provided in exactly the same manner with the only practical limitation being the number of interrupters which can be conveniently handled in a magazine.

The system provides for an automatic time delay between the firing of one interrupter and the closing of switch contact 36 in the next interrupter of the sequence. Such delay results from the size of aperture 48, which controls the release of gas into chamber 44, and the break point of pins 49. To increase the time delay, the size of aperture 48 is reduced or the weight of contact 36 or the strength of pins 49 is increased. The total delay provided is determined by the recovery requirements of the power system and should be sufficient to permit clearing of the fault by circuit breaker action. For example if the subsequent interrupter is installed too rapidly, the fault will not have cleared and the subsequent interrupter will also fire.

The present invention provides a system for activating explosive interrupters in a predetermined sequence. The sequence is determined by the gas conduit interconnections formed between the interrupters. The internal gas pressures normally created by explosive interrupters are used to provide automatic removal and insertion of interrupters to control a succession of power line faults. With a 20-interrupter magazine, up to 20 fault cycles can be readily handled without the need for external switching. The invention provides extremely fast fault current control while producing large voltage drops. Arc extinction in the interrupters occurs usually within one millisecond. This type of interrupter can also be reused following remanufacturing at minimal cost.

Variations are possible in the above-described system. For example, the interrupters could be provided with parallel fuses into which the current is momentarily diverted following detonation, as is well known in the art. The use of either external foil fuses or internal fuse elements within the interrupters would tend to increase the voltage-handling capabilities of the interrupters. The disadvantage of fuses is their additional cost. Vacuum interrupters 60 and 62 could be eliminated if additional recovery voltage protection proves unnecessary. Such vacuum interrupters generally employ movable contacts which are mechanically actuated and are therefore considerably slower than the explosive interrupters of the present invention. As such, vacuum interrupters 60 and 62 do not improve the speed of the system. An additional line-protection element, such as a surge arrester, could also be installed in parallel with impedance 56.

Other configurations of explosively activated current interrupters are also possible within the scope of the present invention. The conductive tube 16 could assume other shapes or be provided with annular scorings or lines of weakness to obtain regulated separation, for example. The explosive charge could be positioned outside the conductive member. The connecting contact switch could be actuated by a mechanical linkage from a pneumatic chamber. Other types of dielectric substances could be provided within the interrupter.

A chemically activated current interrupter is provided which uses the principle of explosive actuation to attain a fast and reliable fault current limiter system. The invention automatically installs another interrupter on a power line upon completion of a fault current diversion.

What is claimed is:

1. An explosively activated current interrupter for use in a system employing a plurality of said interrupters activated in a predetermined sequence of said interrupters to control a succession of power line faults, said interrupter comprising: a housing, a conductive member in said housing for conducting current carried by said power line, switch means in said housing for interconnecting said conductive member with said power line, said switch means having a closed position in which said switch means electrically connects said conductive member with said power line and an open position electrically disconnecting said conductive member from said power line, insertion means for closing said switch means a predetermined time after actuation of said insertion means, explosive means in said housing for breaking said conductive member into a plurality of separated portions upon detonation to interrupt said current carried by said power line and for opening said switch means, and means responsive to the detonation of said explosive means for actuating said insertion means in the next interrupter of said predetermined sequence of said interrupters.

2. A current interrupter as in claim 1 in which said insertion means includes pneumatic means for closing said switch means by gas pressure.

3. A current interrupter as in claim 2 in which said means responsive to the detonation of said explosive means includes a gas conduit for supplying gas released on detonation of said explosive means to said pneumatic means in said next interrupter of said predetermined sequence.

4. A current interrupter as in claim 2 in which said pneumatic means includes a cylindrical chamber in said housing, said switch means including a contact supported for movement in said cylindrical chamber.

5. A current interrupter as in claim 1 in which said conductive member includes an interior cavity, said explosive means being disposed inside said conductive member in said cavity.

6. A current interrupter as in claim 5 further including a dielectric substance in said interior cavity of said conductive member.

7. A current interrupter as in claim 5 in which said conductive member includes substantially cylindrical wall portions, further including a plurality of ring-shaped members in said housing each surrounding said conductive member, said ring-shaped members being spaced apart.

8. A current interrupter as in claim 7 in which said explosive means disposed inside said conductive member includes a detonating cord substantially coaxial with the axis of said cylindrical wall portions, and further including a dielectric substance inside said conductive member.

9. An explosively activated current interrupter for use in a system employing a plurality of said interrupters activated in a predetermined sequence of said interrupters to control a succession of power line faults, said interrupter comprising: a housing, a conductive member in said housing for conducting current carried by said power line, switch means in said housing for interconnecting said conductive member with said power line, said switch means having a closed position in which said switch means electrically connects said conductive member with said power line and an open position electrically disconnecting said conductive member from said power line, pneumatic means in said housing for closing said switch means by gas pressure in said pneumatic means, explosive means in said housing for breaking said conductive member into a plurality of separated portions upon detonation to interrupt said current carried by said power line and for opening said switch, and conduit means for supplying gas released upon detonation of said explosive means to said pneumatic means in the next interrupter of said predetermined sequence of said interrupters.

10. A current interrupter as in claim 9 in which said pneumatic means includes a cylindrical chamber, said conduit means supplying said gas into said cylindrical chamber, and in which said switch means includes a contact supported for movement between open and closed positions in said cylindrical chamber to respectively open and close said switch means.

11. A current interrupter as in claim 10 including latching means in said cylindrical chamber for holding said contact in said open position until the gas pressure in said chamber reaches a predetermined level, said latching means releasing said contact for movement into said closed position when said gas pressure exceeds said predetermined level.

12. A current interrupter as in claim 11 in which said latching means includes frangible members.

13. A current interrupter as in claim 9 in which said conduit means includes a control aperture therein for restricting said gas supplied to said pneumatic means whereby time delay is provided before said pneumatic means closes said switch means.

14. A current interrupter as in claim 9 in which said conductive member includes an interior cavity, said explosive means being disposed inside said conductive member in said cavity.

15. A current interrupter as in claim 14 further including a dielectric substance in said interior cavity of said conductive member.

16. A current interrupter as in claim 15 in which said dielectric substance is a dielectric solid which is dispersed between said separated portions of said conductive member upon detonation of said explosive means.

17. A current interrupter as in claim 16 in which said dielectric substance is a deformable solid, made as paraffin.

18. A current interrupter as in claim 16 in which said conductive member includes substantially cylindrical wall portions, further including a plurality of ring-shaped members in said housing each surrounding said conductive member, said ring-shaped members being spaced apart.

19. A system for controlling power line faults comprising: a plurality of explosively activated current interrupters which are activated in a predetermined sequence of said interrupters, each said interrupter including a housing, a conductive member in said housing for conducting current carried by said power line, switch means in said housing for interconnecting said conductive member with said power line, said switch means having a closed position in which said switch means electrically connects said conductive member with said power line and an open position electrically disconnecting said conductive member from said power line, pneumatic means in said housing for closing said switch means by gas pressure in said pneumatic means, explosive means in said housing for breaking said conductive member into a plurality of separated portions upon detonation to interrupt said current carried by said power line and for opening said switch means, and conduit means between successive pairs of said interrupters in said predetermined sequence of said interrupters, said conduit means for supplying gas released upon detonation in sequence of said explosive means in one of said interrupters to said pneumatic means in the next interrupter of said predetermined sequence whereby activation of one of said interrupters causes removal of said one interrupter from said power line and insertion of said next interrupter onto said power line.

20. A system as in claim 19 in which said pneumatic means in each said interrupter includes a cylindrical chamber, said conduit means supplying said gas into said cylindrical chamber, and in which said switch means in said interrupter includes a contact supported for movement between open and closed positions in said cylindrical chamber to respectively open and close said switch means.

21. A system as in claim 20 in which each said interrupter includes latching means in said cylindrical chamber for holding said contact in said open position until the gas pressure in said chamber reaches a predetermined level, said latching means releasing said contact for movement into said closed position when said gas pressure exceeds said predetermined level.

22. A system as in claim 21 in which said latching means includes frangible members.

23. A system as in claim 19 in which said conduit means between each successive pair of said interrupters includes a control aperture therein for restricing said gas supply to each said pneumatic means whereby a time delay is provided between the removal of said one interrupter from said power line and the insertion of said next interrupter onto said power line.

* * * * *